United States Patent [19]

Ackermann

[11] Patent Number: 5,375,057
[45] Date of Patent: Dec. 20, 1994

[54] METHOD OF STEERING ROAD VEHICLES HAVING FRONT-WHEEL AND REAR-WHEEL STEERING

[75] Inventor: Jürgen Ackermann, Herrsching, Germany

[73] Assignee: Deutsche Forschungsanstalt für Luft- und Raumfahrt e.V., Cologne, Germany

[21] Appl. No.: 753,594

[22] Filed: Sep. 3, 1991

[30] Foreign Application Priority Data

Sep. 6, 1990 [DE] Germany ............................ 4028320

[51] Int. Cl.$^5$ ............................................. B62D 6/04
[52] U.S. Cl. ............................ 364/424.05; 364/426.02; 180/140; 280/91
[58] Field of Search ..................... 364/424.05, 426.02; 180/140, 141, 142, 79.1; 280/91

[56] References Cited

U.S. PATENT DOCUMENTS

| | | | |
|---|---|---|---|
| 4,690,431 | 9/1987 | Ito et al. | 280/771 |
| 4,703,822 | 11/1987 | Kawamoto et al. | 180/140 |
| 4,705,130 | 11/1987 | Fukunaga et al. | 180/140 |
| 4,706,771 | 11/1987 | Kawabe et al. | 180/142 |
| 4,718,685 | 1/1988 | Kawabe et al. | 280/91 |
| 4,878,557 | 11/1989 | Shibahata et al. | 180/140 |
| 4,967,865 | 11/1990 | Schindler | 180/79.1 |
| 5,019,982 | 5/1991 | Furukawa | 364/424.05 |
| 5,157,611 | 10/1992 | Ikeda et al. | 364/426.02 |
| 5,159,553 | 10/1992 | Karnopp et al. | 364/424.05 |
| 5,267,160 | 11/1993 | Ito et al. | 364/424.05 |

FOREIGN PATENT DOCUMENTS

3610461 10/1986 Germany.
3831932 4/1989 Germany.
3930445 3/1990 Germany.

*Primary Examiner*—Kevin J. Teska
*Assistant Examiner*—Susan Wieland
*Attorney, Agent, or Firm*—Browdy and Neimark

[57] ABSTRACT

A method of steering road vehicles having front-wheel and rear-wheel steering is provided in which by an integrating feedback of a measured yaw rate signal to the front-wheel steering the yaw motion is decoupled from the lateral motion of the front axle, the problem of steering thereby being split into two subproblems to be solved separately, that is into a lateral track guiding of the front axle by a signal which a driver generates with the steering wheel, and into an automatic control of the yaw motion, and the eigenvalues of the yaw motion can be shifted as desired by feedback of the measured yaw rate signal to the rear-wheel steering in such a manner that the choice of the yaw eigenvalues has no influence on the steering transfer function from the steering wheel to the lateral motion of the front axle.

When employing the steering method according to the invention the driver no longer has to worry at all about the yaw motion of his vehicle; it is stable. Furthermore, via the rear-wheel steering eigenvalues of the yaw motion can be fixed as desired in adaption to the desired driving mode, such as sporting or comfortable.

3 Claims, 4 Drawing Sheets

METHOD OF STEERING ROAD VEHICLES HAVING FRONT-WHEEL AND REAR-WHEEL STEERING

BACKGROUND OF THE INVENTION

1. Field of the Invention

The invention relates to a method of steering road vehicles having front-wheel and rear-wheel steering.

2. Description of the Prior Art

In the steering of road vehicles, such as automobiles, trucks, buses and the like, at present it is required of the driver that he understands the dynamic behavior of the vehicle under different operating conditions, such as load, road condition, travelling speed, etc., and adapts his driving thereto. Admittedly, the assessment of limit situations, such as icy road or narrow curves, will always remain the responsibility of the driver; however, before such limits are reached there are considerable differences between an experienced driver and a beginner and between various vehicles.

The difficulties are known which can arise on occurrence of unexpected yaw movements of the vehicle, for example on a wet road, sudden avoidance maneuver, driving into a side wind at the edge of a wood or behind a bridge, etc. By incorrect steering reactions in such situations the yaw movements can then even be further intensified.

Many traffic accidents are due to driver's errors and are caused in particular by incorrect assessment of the vehicle dynamics at different speeds, different road surfaces and different loads. Existing vehicle steering systems provide the driver with only very inadequate assistance, if at all.

Hitherto, steering a constantly maintained steering angle is converted to a stationary circular path with constant radius and associated yaw rate. However, what the stationary value is and how the transient operation proceeds depends on the changing operating conditions.

In vehicles offered on the market today the steering is frequently power assisted; however, there is always a mechanical connection from the steering wheel to the front-wheels, i.e. the steering wheel position commands the steering angle of the front wheels with a small delay.

In experimental vehicles and also in the literature, for example in "Mechatronics for cars: integrating machines and electronics to prevent skidding on icy roads", by Y. Hossam El-Deen and Ali Seireg in Computers Mechanical Engineering, 1987, p. 10 to 22, the possibility of a so called "drive-by-wire" system has also already been investigated; here, the steering wheel angle is measured, for example by a potentiometer tap, which is then a command variable of an electrical control circuit comprising sensors and of a control law which is implemented in a microcomputer and by means of which an electrical or hydraulic motor is driven for steering the front wheels. The measured steering angle is compared with a reference input to the so called command variable.

Although the introduction of the drive-by-wire system on a large scale is inhibited today by safety doubts similar to those expressed twenty years ago about the corresponding fly-by-wire system in aircraft, it is in particular the positive experience gathered in air travel with fly-by-wire systems which speak for the introduction of the drive-by-wire system. Secondly drive by wire is being introduced for rear wheel steering. Also future possible developments, for example automatic tracking as being investigated in Europe in the so called Prometheus program as well as in the USA and Japan require a drive-by wire system.

An additional rear-wheel steering was first introduced by Japanese manufacturers. For example, Honda employs a mechanical connection by which the rear wheels are steered only in dependence upon the steering wheel angle, in the same sense for smaller angles and in opposite senses for larger angles. Mazda for example have developed a drive-by-wire system for the rear wheels, the ratio of the steering angles at the front and rear being varied in dependence upon the vehicle velocity. In their drive-by-wire system for the rear-wheel steering Nissan and Mitsubishi additionally utilize a pressure measurement from the front-wheel power-assisted steering.

In a Ford test vehicle the yaw rate r is measured with a gyroscope and introduced into the rear-wheel steering system. The yaw rate r is regarded as additional controlled variable, i.e. from the steering wheel angle and the travelling velocity a fictional yaw rate $r_{ref}$ is calculated and the difference ($r_{ref}-r$) is passed onto the rear-wheel steering via a controller specifically designed for the vehicle (see B. Los A. Matheis, J. E. Nametz and R. E. Smith, Construction and development of a vehicle with microprocessor-controlled all-wheel steering, VDI Report no. 650, Dusseldorf, 1987, p. 239-257).

The idea of using a fictituous yaw rate reference signal $r_{ref}$ is found in various other publications. However, very inconsistent particulars are given on the calculation or determination of the value $r_{ref}$ which is determined in each case empirically or also theoretically from the stationary circular travel.

SUMMARY OF THE INVENTION

The invention therefore has as its object the provision of a method of steering road vehicles with front-wheel and rear-wheel steering in which the effects of yaw movements on the lateral movement of the front axle are automatically and completely compensated and at the same time eigenvalues of the yaw motions can be specified as desired.

The invention therefore proposes in a method of steering a road vehicle having front-wheel and rear-wheel steering the improvement in which by an integrating feedback of a measured yaw rate signal to the front-wheel steering the yaw motion is decoupled from the lateral motion of the front axle, the problem of steering thereby being split into two subproblems to be solved separately, that is into a lateral track guiding of the front axle by a signal which a driver generates with the steering wheel, and into an automatic control of the yaw motion, and the eigenvalues of the yaw motion can be shifted as desired by feedback of the measured yaw rate signal to the rear-wheel steering in such a manner that the choice of the yaw eigenvalues has no influence on the steering transfer function from the steering wheel to the lateral motion of the front axle.

In the steering method according to the invention for road vehicles having front-wheel and rear-wheel steering, the steering angle is not controlled directly by the steering wheel angle but a yaw rate is commanded. Compared with other systems in which a gyro is also used for measuring the yaw rate, however, in the steering method according to the invention the frequently dubious estimation of a fictituous reference yaw rate ($r_{ref}$) derived in accordance with different criteria from the travelling velocity and the steering wheel angle is eliminated.

When using the steering method according to the invention the driver thus need only, as hitherto, perform the path planning and the compensation of lateral deviations of the front axle of the vehicle from the planned path. This is substantially facilitated for him in accordance with the invention in that the yaw motion dependent on variable parameters no longer has any feedback on the lateral motion of the front axle. Thus, when using the steering method according to the invention the driver need no longer worry about the yaw motion of the vehicle at all; it is always stable and can be damped by constructional measures.

The particular advantage with the method according to the invention resides in that the necessary control need no longer be designed specifically for the vehicle or varied in accordance with the operating conditions because it is a simple robust control in which in accordance with the invention the yaw rate is passed via the gyro feedback to an integrating actuator.

Furthermore, since the vehicle has an additional rear-wheel steering, in accordance with the invention via this rear-wheel steering eigenvalues of the yaw motion can be placed as desired; moreover, these eigenvalues can even be made adjustable for adaptation to various driver wishes, for example a more sporting or a comfortable driving mode.

The components required for constructing a steering system designed in accordance with the method according to the invention, such as gyroscopes, integrating motors or actuators, and the like, are commercially usual and thus available because they are already employed and used in vehicle construction for other purposes but hitherto have not been combined in accordance with the method according to the invention to a steering system.

The gyroscopes required for series use in road vehicles must be reliable and cheap. On the other hand, the demands made on their measuring accuracy and on low drift, i.e. demands which make gyroscopes otherwise expensive, are only low. For example, the following can be used in the steering method according to the invention: Vibration gyros as made by Robert Bosch GmbH, Berlin, and described at the DGON-Symposium Gyro Technology, 1990 in Stuttgart by Kaiser, Boruschewitz, Hamisch, Gärtner, Pfaff in "Development of a low cost gyro based on a vibrating piezoelectric plate", vibration gyros made by British Aerospace, Plymouth ("Solid state vibrating shell gyro"), or vibration gyros made by GEC Ferranti, Edinburgh.

Likewise, hydraulic actuators (without position feedback) have already been used for automatic tracking, as is described for example by W. Darenberg in "Automatic tracking of motor vehicles", Automobilindustrie 1987, pages 155 to 159. By using better magnetic materials electrical actuators can also be employed for vehicle steering. Both the hydraulic actuators and the electrical actuator motors have an integrating behavior.

BRIEF DESCRIPTION OF THE DRAWINGS

Hereinafter the invention will be explained in detail with reference to a preferred embodiment with the aid of the attached drawings, wherein.

DESCRIPTION OF THE PREFERRED EMBODIMENTS

Figure 2:
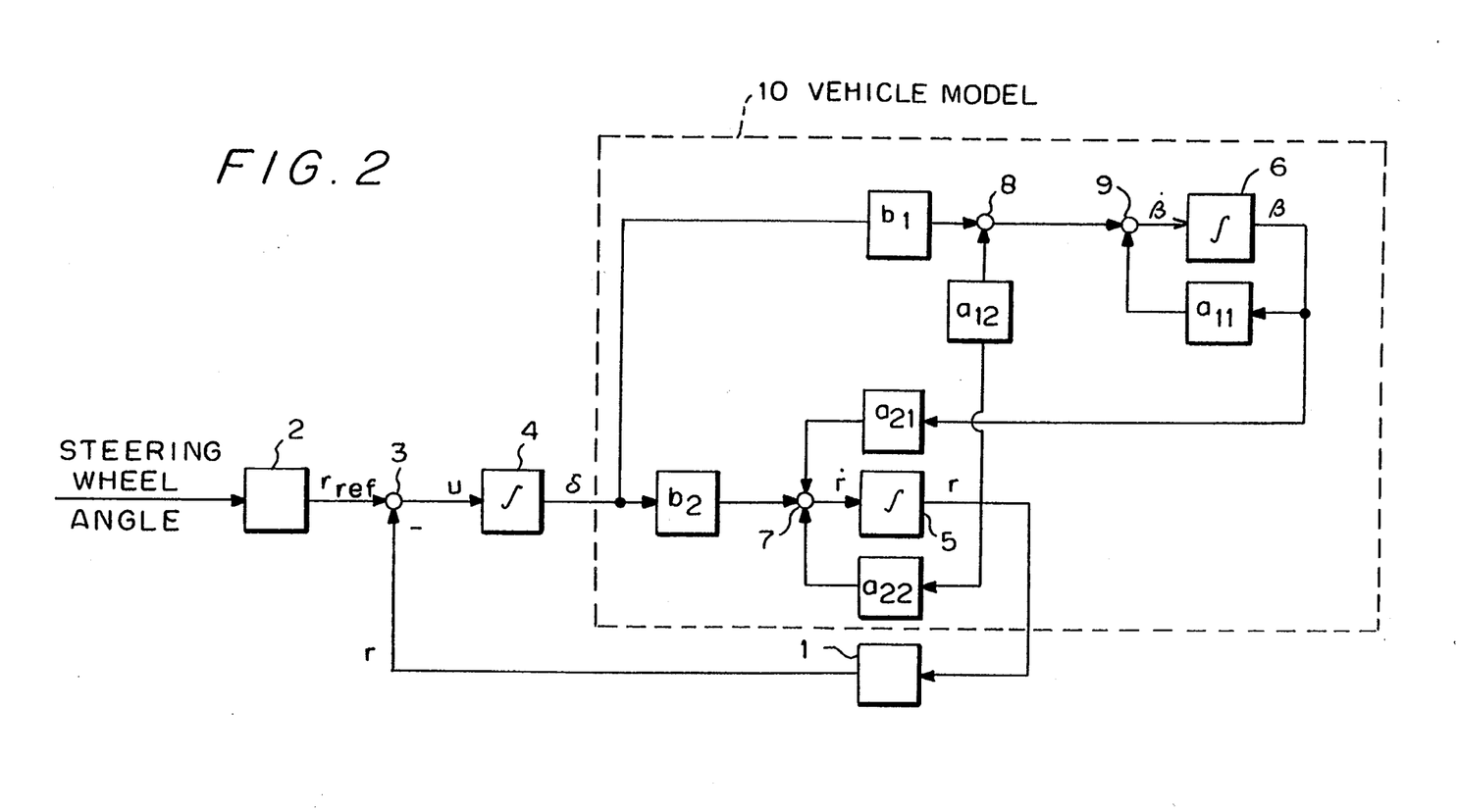
FIG. 2 is a block diagram in which the relationship of various parameters of a state space description are illustrated as well as the feedback system for front-wheel steering.
Figure 3:
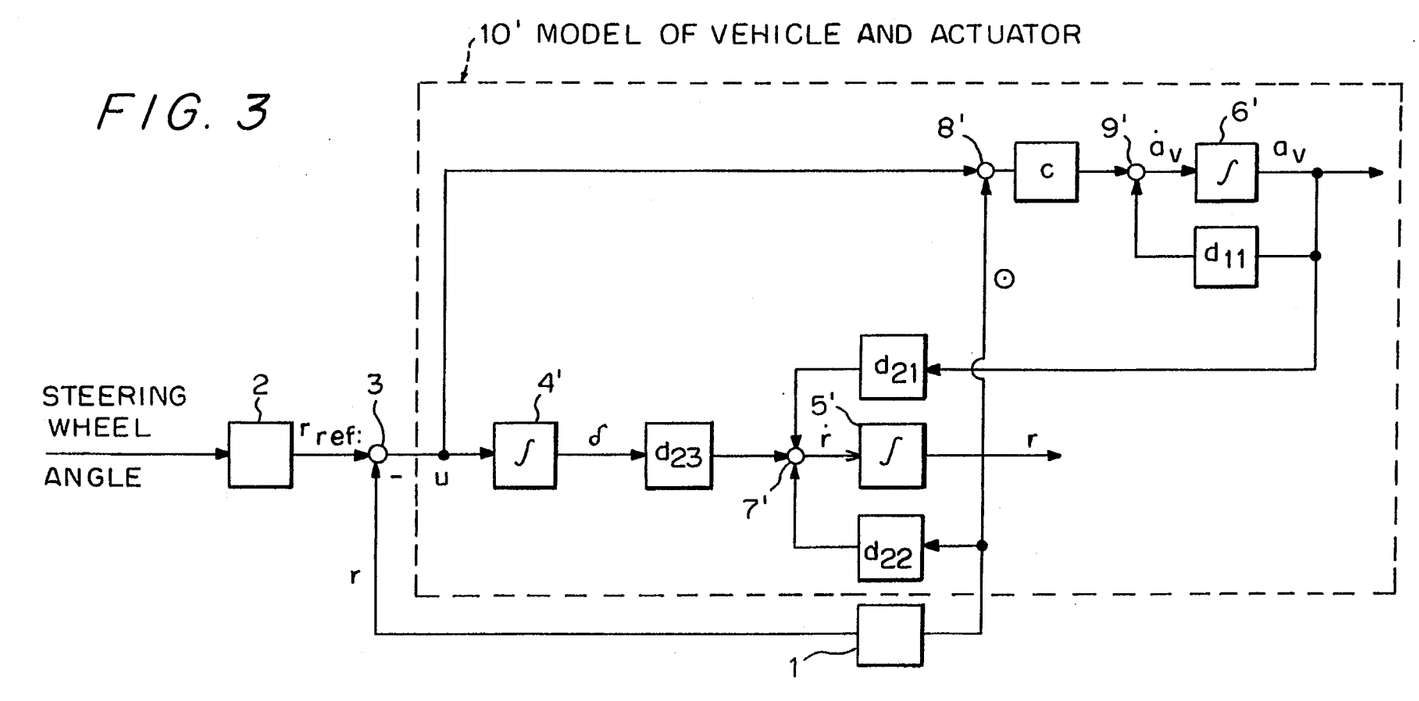
FIG. 3 is a block-circuit diagram equivalent to FIG. 2 in which other state parameters are used to derive the control law.
Figure 4:
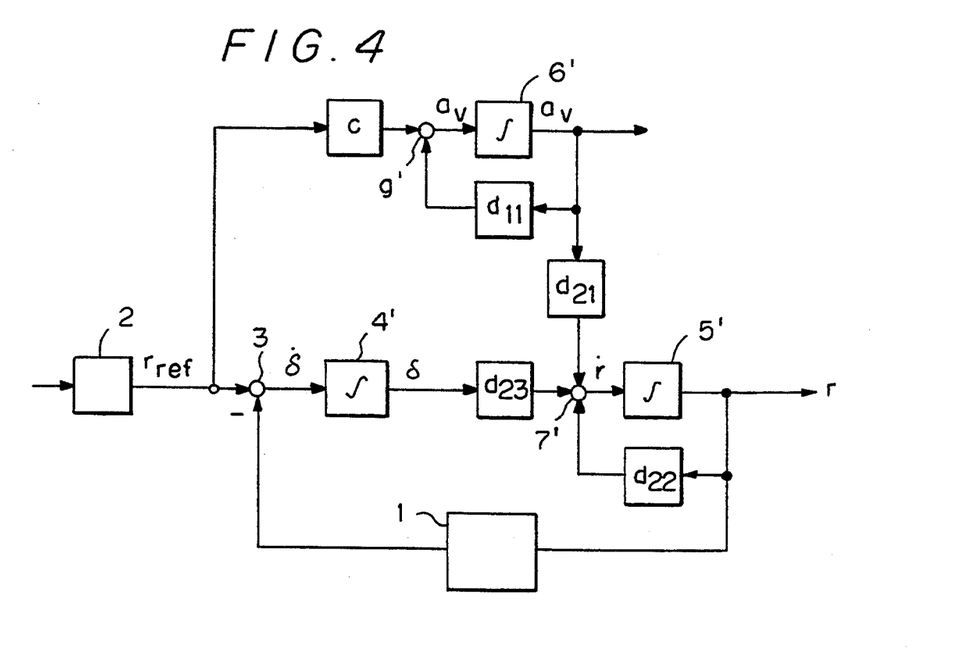
FIG. 4 is a simplified illustration of the block circuit diagram of FIG. 3.

Firstly, the theory underlying the invention will be dealt with and thereafter illustrated with the aid of block diagrams given in FIGS. 2 to 4 in which the construction of a steering system made according to the invention from commercially available components is shown and the mode of operation thereof indicated.

Figure 1:
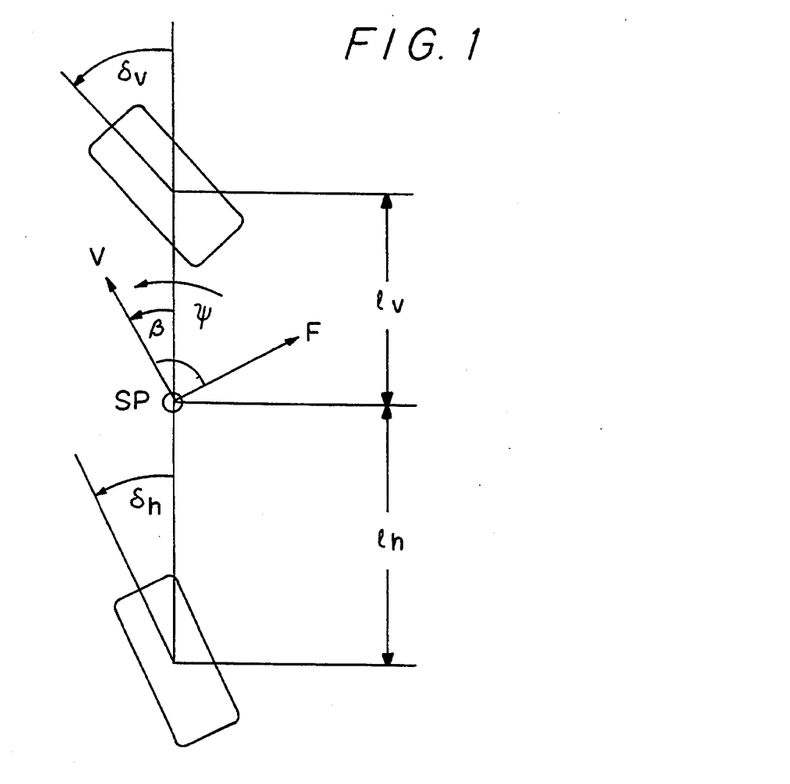
FIG. 1 is a schematic view of a single-track vehicle model travelling through a curve.

The vehicle dynamics in the steering movement are based on a linearized mathematical model. This is a single-track model which was introduced by P. Riekert and T. E. Schunk in the publication "Vehicle mechanics of rubber-tired motor vehicles" in Ing. Archiv 1940, the motions being described in the degrees of freedom yaw and sideslip. In the book "Fahrwerktechnik", published by the Vogel-Verlag, Wurzburg, 1987, in the chapter "Fahrverhalten", A. Zomotor uses the variable designations entered in FIG. 1 as follows:

$l_v$ = distance center of gravity—front axle
$l_h$ = distance center of gravity—rear axle
v = velocity
$\beta$ = sideslip angle (between the v vector and the vehicle longitudinal axis)
$\dot{\psi}$ = yaw rate (between vehicle longitudinal axis and an inertial reference system)
$\delta_v$ = steering angle (front)
$\delta_h$ = steering angle (rear)
SP = center of gravity Variable parameters of the vehicle and the road surface are:

$C_v$, $C_h$ = cornering stiffness, front and rear
$m_g$ = vehicle mass
$I_{gz}$ = vehicle moment of inertia.

The equations of motion for the single-track model with only front-wheel steering, i.e. $\delta_v = \delta$ and $\delta_h = 0$, are then in accordance with Zomotor in the text book cited (p. 101):

$$m_g v \dot{\beta} + \frac{1}{v}(m_g v^2 + C_v l_v - C_h l_h)\dot{\psi} + (C_v + C_h)\beta - C_v \delta = 0 \quad (1)$$

$$I_{gz}\ddot{\psi} + \frac{1}{v}(C_v l_v^2 + C_h l_h^2)\dot{\psi} - (C_h l_h - C_v l_v)\beta - C_v l_v \delta = 0 \quad (2)$$

$$F_c = m_g v (\dot{\psi} + \dot{\beta}) \quad (3)$$

If for the yaw rate a variable $r = \dot{\psi}$ ($= d\psi/dt$) is introduced, then the equations (1) and (2) can be written as:

$$\dot{\beta} = -(m_g v^2 + C_v l_v - C_h l_h)\cdot r/m_g v^2 - (C_v + C_h)\beta/m_g v + C_v \delta/m_g v \quad (1')$$

$$\dot{r} = -(C_v l_v^2 + C_h l_h^2) r/I_{gz} v - (C_v l_v - C_h l_h)\beta/I_{gz} + C_v l_v \delta/I_{gz} \quad (2')$$

or in matrix notation as state model $$\begin{bmatrix} \dot{\beta} \\ \dot{r} \end{bmatrix} = \begin{bmatrix} a_{11} & a_{12} \\ a_{21} & a_{22} \end{bmatrix} \begin{bmatrix} \beta \\ r \end{bmatrix} + \begin{bmatrix} b_1 \\ b_2 \end{bmatrix} \cdot \delta \qquad (4)$$

with the coefficients $a_{11} = -(C_v + C_h)/m_g v$ $a_{12} = -1 - (C_v l_v - C_h l_h)/m_g v^2$ $a_{21} = -(C_v l_v - C_h l_h)/I_{gz}$ $a_{22} = -(C_v l_v^2 + C_h l_h^2)/I_{gz} v$ $b_1 = C_v/m_g v$ $b_2 = C_v l_v/I_{gz}$ For deriving the control law two simplifying assumptions are made:

(1) The mass distribution in the longitudinal direction of the vehicle is equivalent to two concentrated masses at the front and rear axles and this gives the vehicle moment of inertia $$I_{gz} = m_g l_v l_h \qquad (5)$$

and the position of the center of gravity and thus the distances center of gravity—front axle and rear axle $l_v$ and $l_h$ do not change with the vehicle mass $m_g$.

(2) The cornering stiffnesses have a common factor $\mu$ which describes the frictional contact with the road surface, i.e.

$$C_v = \mu c_v, \quad C_h = \mu c_h \qquad (6)$$

where $\mu = 1.0$ for dry roads and $\mu = 0.5$ for wet roads. This factor can be employed for "normalizing" the mass, i.e. the normalized mass can be defined as follows:

$$m = m_g/\mu \qquad (7)$$

After making these assumptions, the coefficients of the state model (4) are:

$a_{11} = -(c_v + c_h)/mv$ $a_{12} = -1 - (c_v l_v - c_h l_h)/mv^2$ $a_{21} = -(c_v l_v - c_h l_h)/m l_v l_h$ \qquad (8)

$a_{22} = -(c_v l_v^2 + c_h l_h^2)/m v l_v l_h$ $b_1 = c_v/mv$ $b_2 = c_v/m l_h$

The mathematical model manipulated in this manner describes the influence of the uncertain operating parameter m (vehicle mass/adhesion coefficient) and the travelling velocity v on the dynamics of the single-track model for the steering. For an extremely changed mass distribution in the longitudinal direction of the vehicle, for example with the trunk fully loaded, and for extremely different adhesion coefficients at the front and rear wheels, for example when travelling over a small iced area, deviations from this model occur which however have not been taken into account here in the derivation of the control law.

The interaction of the variables $\beta$, $r$ and $\delta$ according to equation (4) is illustrated by a block 10 in FIG. 2 outlined in dashed line and denoted by "vehicle model".

According to the invention the yaw rate r is measured with a gyro 1. The associated reference value $r_{ref}$ is for example tapped by a potentiometer 2 from the steering wheel angle. An error signal $u = (r_{ref} - r)$ formed in an adder 3 directly, i.e. with a gain of one and without dynamic compensation, controls an integrating actuator 4. In FIG. 2, apart from the coefficients defined and given in equation (4), which are represented by the blocks $a_{11}$, $a_{12}$, $a_{21}$, $a_{22}$, $b_1$ and $b_2$, integrating elements 5 and 6 and further adders 7 to 9 are shown.

The actuator 4 illustrated in FIG. 2 is for example a commercially available hydraulic or electrical actuator motor for the steering angle $\delta$, in which the input signal u is integrated, giving:

$$\dot{\delta} = u \qquad (9)$$

An alternative embodiment is the use of a conventional power-assisted steering with a position feedback within the actuator. This can be described by the following differential equation $$\dot{\delta} = -\frac{1}{T_a}\delta + \frac{1}{T_a} u^* \qquad (10)$$

or the transfer function $$\frac{\delta(s)}{u^*(s)} = \frac{1}{1 + T_a s} \qquad (10')$$

with a time constant $T_a$. By using a PI controller with the transfer function $$\frac{u^*(s)}{u(s)} = \frac{1}{s} + T_a = \frac{1 + T_a s}{s} \qquad (11)$$

an integrating behavior is again obtained. Combining this with equation (10') then gives:

$$\frac{\delta(s)}{u(s)} = \frac{\delta(s)}{u^*(s)} \cdot \frac{u^*(s)}{u(s)} = \frac{1 + T_a s}{(1 + T_a s)s} = \frac{1}{s} \qquad (12)$$

i.e. the same behavior as with the actuator (see equation 9) without feedback is obtained.

The steering angle $\delta$ is introduced as further state variable into the state model (4)

$$\begin{bmatrix} \dot{\beta} \\ \dot{r} \\ \dot{\delta} \end{bmatrix} = \begin{bmatrix} a_{11} & a_{12} & b_1 \\ a_{21} & a_{22} & b_2 \\ 0 & 0 & 0 \end{bmatrix} \begin{bmatrix} \beta \\ r \\ \delta \end{bmatrix} + \begin{bmatrix} 0 \\ 0 \\ 1 \end{bmatrix} u \qquad (13)$$

For deriving the control law, firstly another state variable is introduced instead of the sideslip angle $\beta$, that is the lateral translation $a_v$ at the front axle. According to equation (3) the lateral force $F_c$ at the center of gravity SP is:

$$F_c = m_g v \cdot (\dot{\psi} + \dot{\beta}),$$

and consequently the lateral acceleration $a_{sp}$ at the center of gravity SP: $a_{sp} = v(\dot{\psi} + \dot{\beta})$. With the state model (13) the lateral acceleration $a_{sp}$ at the center of gravity SP is:

$$a_{sp} = v(\dot{\psi}+\dot{\beta}) = v(r+a_{11}\beta+a_{11}r+b_1\delta) \quad (14)$$

At the front axle there is also the influence of the yaw acceleration $\dot{\psi}=r$, and consequently $$a_v = a_{sp} + l_v \dot{r} \quad (14')$$

and this gives with the equations (13) and (14):

$$a_v = v(r+a_{11}\beta+a_{12}r+b_1\delta) + l_v(a_{21}\beta+a_{22}r+b_2\delta) \quad (15)$$

The coefficients $a_{ij}$ and $b_i$ according to equation (8) are inserted therein, giving:

$$a_v = (va_{11} + l_v a_{21})\beta + (v + va_{12} + l_v a_{22})r + (vb_1 + l_v b_2)\delta \quad (16)$$

$$= \left(-\frac{c_v+c_h}{m} - \frac{c_v l_v - c_h l_h}{m l_h}\right)\beta +$$

$$\left(-\frac{c_v l_v - c_h l_h}{mv} - \frac{c_v l_v^2 + c_h l_h^2}{mvl_h}\right)r + \left(\frac{c_v}{m} + \frac{c_v l_v}{ml_h}\right)\delta$$

$$= c\left(-\beta - \frac{l_v}{v} \cdot r + \delta\right)$$

with $$c = c_v(1 + l_v/l_h)/m = c_v l/l_h m \quad (17)$$

The relationship between the new and old state vectors is then:

$$\begin{bmatrix} a_v \\ r \\ \delta \end{bmatrix} = \begin{bmatrix} -c & -cl_v/v & c \\ 0 & 1 & 0 \\ 0 & 0 & 1 \end{bmatrix} \begin{bmatrix} \beta \\ r \\ \delta \end{bmatrix} \quad (18)$$

$$\begin{bmatrix} \beta \\ r \\ \delta \end{bmatrix} = \begin{bmatrix} -1/c & -l_v/v & 1 \\ 0 & 1 & 0 \\ 0 & 0 & 1 \end{bmatrix} \begin{bmatrix} a_v \\ r \\ \delta \end{bmatrix} \quad (19)$$

and the state equation (13), after some intermediate transformations, is given the form:

$$\begin{bmatrix} \dot{a}_v \\ \dot{r} \\ \dot{\delta} \end{bmatrix} = \begin{bmatrix} d_{11} & d_{12} & d_{13} \\ d_{21} & d_{22} & d_{23} \\ 0 & 0 & 0 \end{bmatrix} \begin{bmatrix} a_v \\ r \\ \delta \end{bmatrix} + \begin{bmatrix} c \\ 0 \\ 1 \end{bmatrix} u \quad (20)$$

with the coefficients $$d_{11} = -c/v$$

$$d_{12} = c$$

$$d_{13} = 0$$

$$d_{21} = -(c_v l_v - c_h l_h)/ml_v l_h$$

$$d_{22} = -c_h(1+l_h/l_v)/mv$$

$$d_{23} = c_h/ml_v$$

Decisive for derivation of the control law is the fact that the coefficients $d_{13}=0$ and $d_{12}=c$. This is emphasized by the following notation:

$$\begin{bmatrix} \dot{a}_v \\ \dot{r} \\ \dot{\delta} \end{bmatrix} = \begin{bmatrix} d_{11} & c & 0 \\ d_{21} & d_{22} & d_{23} \\ 0 & 0 & 0 \end{bmatrix} \begin{bmatrix} a_v \\ r \\ \delta \end{bmatrix} + \begin{bmatrix} c \\ 0 \\ 1 \end{bmatrix} u \quad (21)$$

According to the invention, for all vehicles and operating conditions a feedback $$u = r_{ref} - r \quad (22)$$

is used, the variable $r_{ref}$ being the reference value for the yaw rate r predefined for example via a potentiometer tap. Inserting the control law (22) in equation (21) then gives $$\begin{bmatrix} \dot{a}_v \\ \dot{r} \\ \dot{\delta} \end{bmatrix} = \begin{bmatrix} d_{11} & 0 & 0 \\ d_{21} & d_{22} & d_{23} \\ 0 & -1 & 0 \end{bmatrix} \begin{bmatrix} a_v \\ r \\ \delta \end{bmatrix} + \begin{bmatrix} c \\ 0 \\ 1 \end{bmatrix} r_{ref} \quad (23)$$

This is referred to as a canonical form of the state representation for dividing the system into an observable and an unobservable subsystem. It can be seen from equation (23) that the subsystem with the states r and $\delta$ is not observable from the first variable $$a_v = [1\ 0\ 0] \begin{bmatrix} a_v \\ r \\ \delta \end{bmatrix} \quad (24)$$

Consequently, the dynamics thereof, dependent on changing operating conditions, also do not enter the transfer function from the steering wheel to the lateral acceleration of the front axle. This transfer function derives from the controllable and observable subsystem $$\dot{a}_v = d_{11}a_v + cr_{ref} \quad (25)$$

as $$\frac{a_v(s)}{r(s)} = \frac{c}{s - d_{11}} = \frac{c}{s + c/v} = \frac{v}{1 + Ts} \quad (26)$$

with the time constant $$T = v/c = vml_h/c_v l \quad (27)$$

The block diagram of FIG. 3 illustrates the interaction of the variables $a_v$, r, $\delta$ and u in equation (21). In FIG. 3, apart from the coefficients defined and set forth in equation (20), which are represented by blocks $d_{11}$, $d_{21}$, $d_{22}$, $d_{23}$ and c, the gyro 1, the potentiometer 2, integrating elements 4' to 6' and the adders 3 and 7' to 9' are illustrated.

The inner connection in the vehicle model 10' denoted in FIG. 3 by · is cancelled out in its effect by the feedback of the yaw rate r measured by the gyro 1. In FIG. 4 a simplified block circuit diagram is shown from which it can be seen that there is no longer any coupling of the yaw rate r to the lateral acceleration $a_v$ of the front axle. Since however the block circuit diagram of FIG. 4 corresponds in its effect exactly to the system of FIG. 3, the corresponding elements are denoted by the same reference numerals.

A steering command $r_{ref}$ acts on the two subsystems according to FIG. 4 now coupled only in one direction and consequently the dynamics thereof can now be investigated in detail. It is found that on the one hand a lateral acceleration $a_y$ builds up in delayed manner at the front axle according to equation (26) whilst on the other hand a controlling error $\delta = r_{ref} - r$ arises which with a stable control circuit in the stationary state leads to a constant steering angle $\delta$ and thus to $\delta = 0$, so that an error is completely eliminated thereby.

The stability of the circuit can be investigated with the aid of its characteristic polynomial P(s):

$$P(s) = \det\begin{bmatrix} s - d_{22} & -d_{23} \\ 1 & s \end{bmatrix} \quad (28)$$
$$= s^2 - d_{22}s + d_{23}$$
$$= s^2 + (c_h (l_v + l_h)/mvl_v)s + c_h/ml_v$$

When travelling forward both coefficients $c_h(l_v+l_h)/mvl_v$ and $c_h/m_v$ are always positive and the control circuit is thus stable. When travelling backwards the vehicle movement is unstable with and without gyro feedback and must therefore be stabilized by the driver.

From the point of view of the driver, at constant velocity the following difference then results compared with conventional steering. In the conventional steering of front wheels a fixed steering angle block corresponds, depending on the loading of the vehicle and road smoothness, to a smaller or larger steady circular arc. According to the invention, the driver commands a yaw rate which arises independently of the operating conditions and corresponds to a fixed steady circular arc.

Yaw motions which are not initiated by a driver command but for example by a side wind or due to the road surface are now automatically regulated out; this therefore leads to increased safety when for example the vehicle drives out of a wood into a strong side wind.

The yaw rate can for example be measured with the aid of a commercially available gyro. Since only one feedback without a further control algorithm need be implemented, the gyro can for example also be mechanically or hydraulically integrated into the actuator motor for the steering. The reference yaw rate can possibly also be reconstrued from the measurements of two acceleration meters.

In a vehicle with additional rear-wheel steering the dynamics of the yaw motion must be varied as desired. Firstly, equation (28), valid in this form only for a front-wheel steering, is transformed with the aid of a damping variable D and a natural frequency $\omega_n$, i.e. compared with the term $$P(s) = s^2 + 2D\omega_n s + \omega_n^2 \quad (29)$$

Then giving:

$$\omega_n = \sqrt{c_h/ml_v} \quad (30)$$

$$D = \frac{1}{2v}\sqrt{\frac{c_h}{ml_v}} \quad (31)$$

Constructionally, the damping D can be increased by a long wheel base $l_h+l_v$, a low vehicle mass, a center of gravity SP lying far to the front, i.e. a small distance center of gravity—front axle $l_v$, and by a large rear cornering stiffness $c_h$. The natural frequency $\omega_n$ is thereby also made as large as possible.

However, when implementing these design factors conflicts can arise and consequently alternative methods of increasing the damping are of interest. Since the nature of the yaw motion is sensed differently by different drivers or desired to be different by them, it is certainly of interest to provide a facility for switching between a "sporting" driving mode and a "comfortable" driving mode. These possibilities are obtained by the steering behaviour according to the invention in vehicles with an additional rear-wheel steering.

In equation (1) for the lateral motion, taking account of equation (6) the steering term $-c_v\delta$ must be replaced by the term $(-c_v\delta_v - c_h\cdot\delta_h)$, and in equation (2) for the yaw motion the steering term $-c_v l_v\delta$ must be replaced by the term $(-c_v l_v\delta_v + c_h l_h\delta_h)$, $\delta_v$ and $\delta_h$ being the front and rear steering angles respectively. This gives for the state representation (4):

$$\begin{bmatrix}\dot\beta \\ \dot r\end{bmatrix} = \begin{bmatrix} a_{11} & a_{12} \\ a_{21} & a_{22} \end{bmatrix}\begin{bmatrix}\beta \\ r\end{bmatrix} + \begin{bmatrix} b_{11} & b_{12} \\ b_{21} & b_{22} \end{bmatrix}\begin{bmatrix}\delta_v \\ \delta_h\end{bmatrix} \quad (32)$$

with unchanged $a_{ij}$, $b_{11}=b_1$, $b_{21}=b_2$ and $$b_{12}=c_h/m_g v=c_h/mv$$

$$b_{22}=-c_h l_h/I_{gz}=-c_h/ml_v \quad (33)$$

Instead of equation (9) two integrating actuators are now present and consequently:

$$\dot\delta_v=u_v$$

$$\dot\delta_h=u_h \quad (34)$$

From the state equation and the model (13) we then have:

$$\begin{bmatrix}\dot\beta \\ \dot r \\ \dot\delta_v \\ \dot\delta_h\end{bmatrix} = \begin{bmatrix} a_{11} & a_{12} & b_{11} & b_{12} \\ a_{21} & a_{22} & b_{21} & b_{22} \\ 0 & 0 & 0 & 0 \\ 0 & 0 & 0 & 0 \end{bmatrix}\begin{bmatrix}\beta \\ r \\ \delta_v \\ \delta_h\end{bmatrix} + \begin{bmatrix}0 & 0 \\ 0 & 0 \\ 1 & 0 \\ 0 & 1\end{bmatrix}\begin{bmatrix}u_v \\ u_h\end{bmatrix} \quad (35)$$

Equations (14) and (15) can then be expanded to $$a_{sp}=v(r+a_{11}\beta+a_{12}r+b_{11}\delta_v+b_{12}\delta_h) \quad (36)$$

$$a_y=v(r+a_{11}\beta+a_{12}r+b_{11}\delta_v+b_{12}\delta_h)+l_v(a_{21}\beta+a_{22}r+b_{21}\delta_v+b_{22}\delta_h) \quad (37)$$

However:

$$vb_{12}+l_v b_{22}=0 \quad (38)$$

and consequently equation (16) holds true unchanged with $\delta = \delta_v$ and thus also equations (18) and (19). However, from equation (21):

$$\begin{bmatrix} \dot{a}_v \\ \dot{r} \\ \dot{\delta}_v \\ \dot{\delta}_h \end{bmatrix} = \begin{bmatrix} d_{11} & c & 0 & 0 \\ d_{21} & d_{22} & d_{23} & b_{22} \\ 0 & 0 & 0 & 0 \\ 0 & 0 & 0 & 0 \end{bmatrix} \begin{bmatrix} a_v \\ r \\ \delta_v \\ \delta_h \end{bmatrix} + \begin{bmatrix} c & 0 \\ 0 & 0 \\ 1 & 0 \\ 0 & 1 \end{bmatrix} \begin{bmatrix} u_v \\ u_h \end{bmatrix} \quad (39)$$

The feedback of r to $u_v$ according to equation (22) then gives:

$$\begin{bmatrix} \dot{a}_v \\ \dot{r} \\ \dot{\delta}_v \\ \dot{\delta}_h \end{bmatrix} = \begin{bmatrix} d_{11} & 0 & 0 & 0 \\ d_{21} & d_{22} & d_{23} & b_{22} \\ 0 & -1 & 0 & 0 \\ 0 & 0 & 0 & 0 \end{bmatrix} \begin{bmatrix} a_v \\ r \\ \delta_v \\ \delta_h \end{bmatrix} + \begin{bmatrix} c & 0 \\ 0 & 0 \\ 1 & 0 \\ 0 & 1 \end{bmatrix} \begin{bmatrix} r_{ref} \\ u_h \end{bmatrix} \quad (40)$$

The subsystem with the state variables r, $\delta_v$ and $\delta_h$ is then not observable from $a_v$. Thus, a feedback of $a_v$ would not have any influence on the dynamics thereof. The subsystem is controllable from $u_h$ (due to the value $-1$ of the gyro feedback); thus, its eigenvalues are placed as desired by a state vector feedback. The state r (which is obtained by a gyro) and the variables $\delta_v$ and $\delta_h$, which are obtained by front and rear steering angle sensors, can be measured and consequently the state vector feedback can be implemented.

To implement the pole placement the subsystem:

$$\dot{x} = Ax + bu_h, \quad x = [r \delta_v \delta_h]^T \quad (41)$$

with $$A = \begin{bmatrix} d_{22} & d_{23} & b_{22} \\ -1 & 0 & 0 \\ 0 & 0 & 0 \end{bmatrix}, \quad b = \begin{bmatrix} 0 \\ 0 \\ 1 \end{bmatrix}$$

will now be investigated.

By a state vector feedback $$u_h = -k^T x \quad (42)$$

the system is given the characteristic polynomial P(s):

$$P(s) = \det(sI - A + bk^T) = a_0 + a_1 s + a_2 s^2 + s^3 \quad (43)$$

Conversely, for a given characteristic polynomial P(s) from equation (43) the state vector feedback required therefor can be obtained as $$k^T = e^T P(A) \quad (44)$$

with $$e^T = [e_1 \ e_2 \ e_3] = [0 \ 0 \ 1][b, Ab, A^2 b]^{-1}$$

or $$[e_1 \ e_2 \ e_3][b, Ab, A^2 b] = [0 \ 0 \ 1]$$

-continued $$[e_1 \ e_2 \ e_3] \begin{bmatrix} 0 & b_{22} & d_{22} b_{22} \\ 0 & 0 & -b_{22} \\ 1 & 0 & 0 \end{bmatrix} = [0 \ 0 \ 1]$$

$$e^T = [0 \ -1/b_{22} \ 0]$$
$$k^T = [a_0 \ a_1 \ a_2 \ 1]E \quad (45)$$

with the pole placement matrix $$E = \begin{bmatrix} e^T \\ e^T A \\ e^T A^2 \\ e^T A^3 \end{bmatrix} = \begin{bmatrix} 0 & -1/b_{22} & 0 \\ 1/b_{22} & 0 & 0 \\ d_{22}/b_{22} & d_{23}/b_{22} & 1 \\ (d_{22}^2 - d_{23})/b_{22} & d_{22}d_{23}/b_{22} & d_{22} \end{bmatrix} \quad (46)$$

$$= \begin{bmatrix} 0 & ml_v/c_h & 0 \\ -ml_v/c_h & 0 & 0 \\ l/v & -1 & 1 \\ 1 - c_h l^2/mv^2 l_v & c_h l/mvl_v & -c_h l/mvl_v \end{bmatrix}$$

In driving tests it must then be determined which position of the eigenvalues of the yaw motion is considered desirable by drivers.

According to the invention the front steering angle need not be measured. On the contrary, an electronic integrator is used in the rear-wheel steering. Together with an actuator, i.e. a mechanical integrator, a compensator of the second order can thus be construed as illustrated in a block circuit diagram of FIG. 5. The upper part of FIG. 5 corresponds to the simplified form of the block diagram illustrated in FIG. 4, to which only an additional adder 11 has been added. In the lower part of FIG. 5, apart from a reference value pickup 12 for the rear steering additional adders 13 and 14 are provided as well as a further integrator 15 and an integrating actuator 16 besides the coefficient blocks $d_0$, $d_1$, $e_0$, $e_1$ and $b_{22}$.

Figure 5:
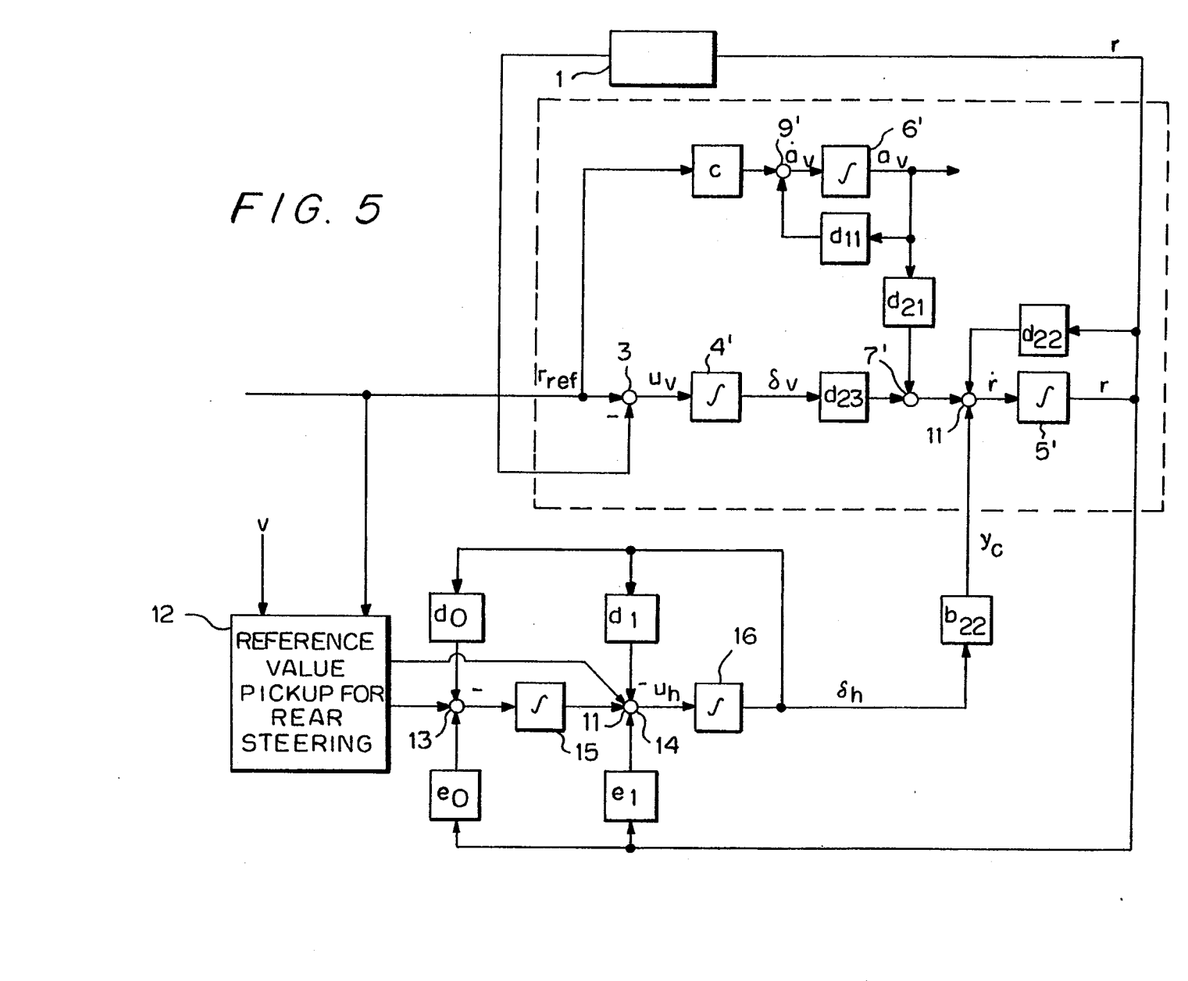
FIG. 5 is a block diagram of a compensator for pole placement for the yaw motion.

The transfer function of the compensator for the control circuit opened at the connection $y_c$ is:

$$\frac{y_c(s)}{r(s)} = b_{22} \frac{e_0 + e_1 s}{d_0 + d_1 s + s^2} \quad (48)$$

Additional input variables of the compensator can be generated by a reference value pickup from the variables $r_{ref}$ and v. The control as a whole has no influence on the eigenvalues of the yaw motion. On the contrary, these eigenvalues result from the combination of the compensator in accordance with the transfer function (48) with the subsystem with the input value $y_c$ and the output value r. Its state model results from equation (40) as follows:

$$\begin{bmatrix} \dot{r} \\ \dot{\delta}_v \end{bmatrix} = \begin{bmatrix} d_{22} & d_{23} \\ -1 & 0 \end{bmatrix} \begin{bmatrix} r \\ d_v \end{bmatrix} + \begin{bmatrix} 1 \\ 0 \end{bmatrix} y_c + \begin{bmatrix} d_{21} \\ 0 \end{bmatrix} a_v + \begin{bmatrix} 0 \\ 1 \end{bmatrix} r_{ref} \quad (49)$$

For the pole placement of the yaw motion only the input $y = b_{22} \delta_h$ is employed and the corresponding transfer function is then:

$$\frac{r(s)}{y_c(s)} = \frac{s}{s^2 - d_{22}s + d_{23}} \quad (50)$$

The characteristic polynomial of the yaw motion follows from the closure condition of the circuit via the compensator:

$$P(s) = (d_0 + d_1s + s^2)(s^2 - d_{22}s + d_{23}) - b_{22}(e_0 + e_1s)s \quad (51)$$
$$= d_0d_{23} + (d_1d_{23} - d_0d_{22} - e_0b_{22})s +$$
$$(d_{23} - d_1d_{22} + d_0 - e_1b_{22})s^2 + (d_1 - d_{22})s^3 + s^4$$

The coefficient comparison with a placement polynomial $$P(s) = a_0 + a_1s + a_2s^2 + a_3s^3 + s^4 \quad (52)$$

gives the equation system $$a_0 = d_0d_{23}$$
$$a_1 = d_1d_{23} - d_0d_{22} - e_0b_{22}$$
$$a_2 = d_{23} - d_1d_{22} + d_0 - e_1b_{22}$$
$$a_3 = d_1 - d_{22} \quad (53)$$

The coefficients $d_{22}$, $d_{23}$ and $b_{22}$ are given therein and the compensator coefficients $d_0$, $d_1$, $e_0$, $e_1$ follows as:

$$d_0 = a_0/d_{23}$$
$$d_1 = a_3 + d_{22}$$
$$e_0 = (d_1d_{23} - d_0d_{22} - a_1)/b_{22}$$
$$e_1 = (d_{23} - d_1d_{22} + d_0 - a_2)/b_{22} \quad (54)$$

For the controlled "yaw dynamics" system the desired eigenvalues can be predefined so that the characteristic polynomial (52) is also predefined and the compensator coefficients $d_0$, $d_1$, $e_0$ and $e_1$ according to (54) furnish the necessary compensator setting.

Since the stability of a vehicle is reliably ensured when using the method according to the invention, further demands regarding the steering of the rear wheels can be implemented without compromise and thus without any effects on the stability. The compensator shown in the block circuit diagram of FIG. 5 provides two intervention possibilities for a reference value pickup processing for example the reference yaw rate $r_{ref}$ predefined by the driver and the travelling velocity v. A typical requirement of this type would be that the yaw rate and lateral acceleration have the same phase delay at the driver's seat as the two motion parameters actually perceived by the driver. Likewise, the alignment of the vehicle longitudinal axis relatively to the curve tangent could be influenced thereby.

I claim:

1. A method of steering a road vehicle using robust decoupling having front-wheel and rear-wheel steering comprising the steps of lateral track guiding by a signal which a driver generates with a steering wheel;

automatic control of yaw motion by decoupling said yaw motion of the vehicle from lateral motion of a front axle of the vehicle including measuring yaw rate signal of the vehicle, feeding said yaw rate signal back to the front-wheel steering, integrating said yaw rate signal during its feedback to the front-wheel steering to control the stability of the vehicle during arbitrary operating conditions;

and shifting eigenvalues of said yaw motion by feedback of said measured yaw rate signal to the rear-wheel steering so that yaw eigenvalues are chosen which have no influence on a steering transfer function from the steering wheel to said lateral motion of the front axle.

2. The method of claim 1 wherein the integration of said yaw rate signal is substantially the only change made to said signal during its feedback to the front-wheel steering.

3. The method of claim 1 further comprising shifting rear-wheel steering eigenvalues of said yaw motion of the vehicle for a predetermined driving mode.

* * * * *